(No Model.)
J. PICKEL & W. SCHMALE.
HAND DRILL.
No. 575,371. Patented Jan. 19, 1897.
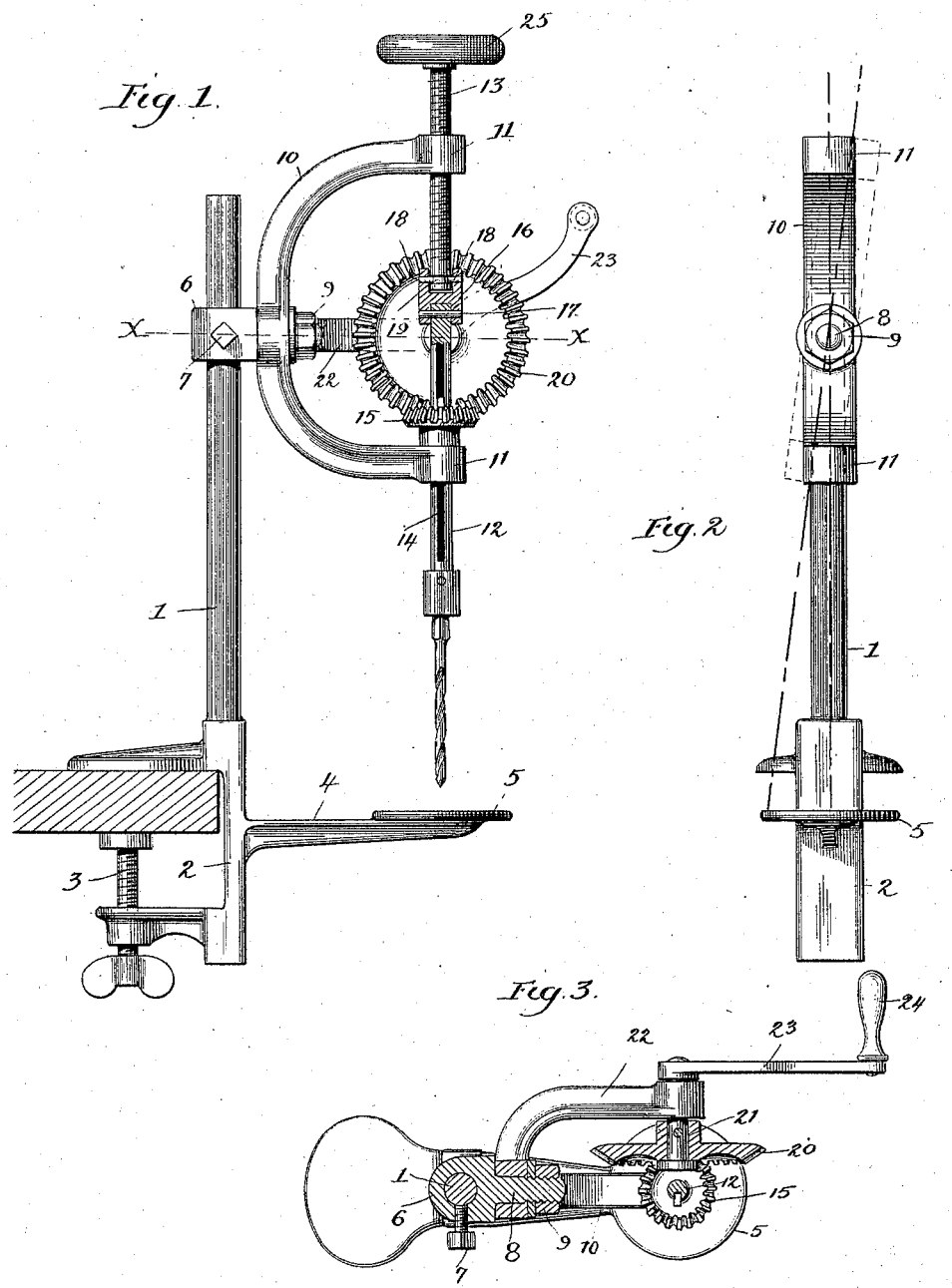
Witnesses:
H. B. Hallock.
S. S. Williamson.
Inventor
Jacob Pickel and
Wm Schmale
By Geo. H. Holgate
Attorney
THE NORRIS PETERS CO., PHOTO-LITHO., WASHINGTON, D. C.

UNITED STATES PATENT OFFICE.

JACOB PICKEL AND WILLIAM SCHMALE, OF BALTIMORE, MARYLAND.

HAND-DRILL.

SPECIFICATION forming part of Letters Patent No. 575,371, dated January 19, 1897.

Application filed April 18, 1896. Serial No. 588,199. (No model.)

*To all whom it may concern:*

Be it known that we, JACOB PICKEL and WILLIAM SCHMALE, citizens of the United States, residing at Baltimore, State of Maryland, have invented certain new and useful Improvements in Hand-Drills, of which the following is a specification.

Our invention relates to a new and useful improvement in hand-drills, and has for its object to so construct a device of this description that it may be secured to any convenient object, such as a bench, and the spindle thereof be revolved and at the same time fed without sidewise wabbling; and it also may be adjusted to a various number of angles to perform work of the character usually requiring a breast-drill without having to lean the weight of the operator thereagainst to cause the drill to take hold of the work.

With these ends in view our invention consists in the details of construction and combination of elements hereinafter set forth, and then specifically designated by the claim.

In order that those skilled in the art to which this invention appertains may understand how to make and use the same, we will describe its construction and operation in detail, referring by number to the accompanying drawings, forming a part of this specification, and in which—

Figure 1 is a side elevation of our improved drill, the coupling between the spindle and the feed-screw being in section; Fig. 2, a front elevation, and Fig. 3 a section at the line $x$ $x$ of Fig. 1.

Referring to the drawings, 1 is a standard round in cross-section and having formed therewith at its lower end a clamp 2, through one member of which passes the binding-screw 3 for the purpose of securing the frame to a suitable object, such as a bench, as clearly shown in Fig. 1. Formed with the body of the clamp and projecting outward therefrom is a bracket 4, provided with a circular surface-plate 5 for the support of the work to be operated upon.

6 is a collar having a hole formed therethrough for passage from the standard, and the set-screw 7 serves to hold this collar in any adjustment upon said standard. A stud 8 projects from the collar and is threaded at its outer end to receive a nut 9, and upon this stud is secured by said nut the yoke 10, upon the outer ends of which are formed hubs 11, the lower one serving as a bearing for the spindle 12 and the upper one being threaded to receive the threaded screw 13. The spindle is splined at 14 and has mounted thereon a beveled pinion 15, adapted to impart rotary motion to said spindle and permit the latter to slide lengthwise therethrough. The spindle and feed-screw are coupled together by the collar 16, in which said spindle is secured by the passage of a pin 17 therethrough, and the screw is revolubly secured in the upper end of the collar by the pins 18 passing through said collar and projecting into a groove 19, formed in the end of said screw.

20 is a beveled gear secured upon the short shaft 21 and adapted to mesh with the pinion 15, so as to cause the latter to revolve, and this short shaft is journaled in the outer end of the arm 22, which forms a part of the yoke 10. Rotary motion is imparted to the gear by the crank 23, having a suitable handle 24, by means of which hand-power is applied to said crank.

From this description the operation of our improvement will obviously be as follows: When it is desired to drill a piece of work that is of a size to be supported by the surface-plate, said work is placed upon this plate and the drill brought into contact therewith by the proper manipulation of the feed-screw 13, through the hand-wheel 25, when by re$^b$ volving the crank the drill will be caused to revolve, as before described, and this will enable the drill to cut its way into the work, and during its operation it may be fed to said work by a further manipulation of the feed-screw, or the drill may be fed after having once been brought into firm contact with the work and caused to revolve by the friction between the collar 16 and the lower end of the feed-screw, causing said screw to take up a slight rotary motion, as will be readily understood. In practice it has been found that for most classes of work the drill will thus be fed automatically without attention upon the part of the operator except to revolve the crank. To take the drill out of its work, a reverse operation of the screw is necessary.

Should it be desired to operate upon work of larger dimensions than can be accommodated upon the surface-plate, it is only necessary to loosen the set-screw 7 and adjust the yoke to one side of the surface-plate, when work of any size may be brought in place to be operated upon by the drill. This is further facilitated by the capacity of the yoke for vertical adjustment upon the standard 1. This latter adjustment also permits the drill to operate through a greater vertical distance, since after it has been fed to the limit of the feed-screw it may be again elevated to the yoke and adjusted downward upon the standard and the operation followed up.

Another advantage of this construction is that by loosening the nut 9 the yoke, and consequently the drill, may be adjusted at any angle to the vertical, which permits the drill to operate upon work in any position, after the manner of a breast-drill.

Having thus fully described our invention, what we claim as new and useful is—

In a device of the character described a standard having formed therewith at its lower end a clamp adapted to be secured to a bench or the like, a bracket provided with a circular plate projecting from the standard, a collar adjustably slidable on the standard, a stud formed on the collar, a yoke adjustably secured thereon, hubs on the yoke, a spindle journaled in one hub, a screw threaded in the other hub, a pinion splined to the spindle, a collar secured to the spindle and swiveled to the screw, a shaft carrying a gear journaled in an arm of the yoke, said gear meshing with the pinion, a crank on the shaft and means for turning the screw as and for the purpose described.

In testimony whereof we have hereunto affixed our signatures in the presence of two subscribing witnesses.

JACOB PICKEL.
WILLIAM SCHMALE.

Witnesses:
S. S. WILLIAMSON,
THOS. KELL BRADFORD.